March 6, 1951  F. HINRICHS  2,544,160
VALVE
Filed April 19, 1946
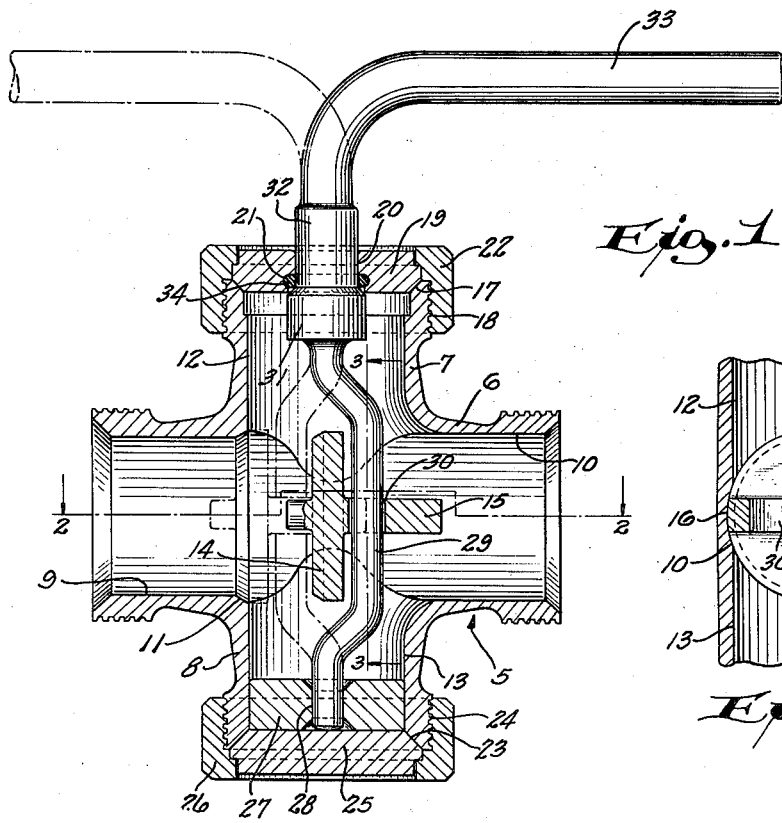
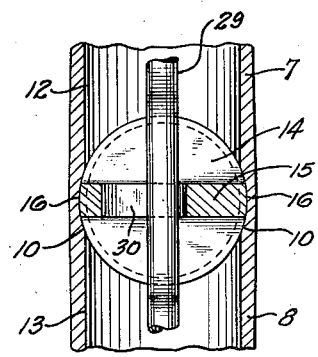
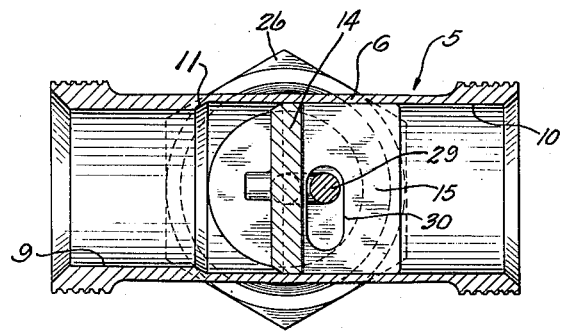
INVENTOR.
Ferdinand Hinrichs
BY
Morsell & Morsell
ATTORNEYS.

Patented Mar. 6, 1951

2,544,160

UNITED STATES PATENT OFFICE 2,544,160

VALVE

Ferdinand Hinrichs, Kenosha, Wis., assignor to Tri-Clover Machine Co., Kenosha, Wis., a corporation of Wisconsin Application April 19, 1946, Serial No. 663,265

10 Claims. (Cl. 251—39)

This invention relates to improvements in valves.

The valve with which the present invention is concerned is particularly adapted for use in connection with milk pasteurizing equipment and for use in other places where a high degree of sanitation is required. Valves used in pasteurizing equipment must be removed and taken apart daily for cleaning. For this reason it is important that the parts have a minimum of food catching projections and that they be readily separable so that removal and cleaning can be quickly effected and reassembly accomplished without loss of valuable time.

In a valve of the type with which the present invention is particularly concerned, the valve member is movable axially of the fluid conducting conduit, and there are usually two axially alined bore portions of different diameter in order to make it possible to form a valve seat. Where the valve seat is thus formed it has been common practice to provide a relatively large difference in the diameter between the two bore portions so that the valve opening will be substantially lessened. Thus, a valve member of sufficiently small diameter may be used to provide for free flow of material between the periphery of the valve member and the wall of the conduit when the valve is open. Where such a small valve member is employed, however, there must be guiding wings or fins to keep the valve member centered and to support it for sliding movement. Furthermore, where the valve opening is relatively small and where there is a relatively large difference in diameter between the two bore portions, there is necessarily a relatively large annular shoulder behind which milk solids can collect to contaminate the equipment. Such a valve, therefore, as commonly constructed, is objectionable for use in the food industry or for other uses where sanitation is a factor.

It is a general object of the present invention to provide a valve of the class described which provides two alined bore portions with a very small difference in diameter, just sufficient to form a valve seat without having a large shoulder to trap milk or other fluid, and which nevertheless provides for the free flow of milk or similar liquid past the periphery of the valve member, when the latter is open, with a minimum of obstruction to the flow, and which also provides support for the valve member to support and guide the latter during its axial movement into and out of engagement with the valve seat.

A further object of the invention is to provide a construction as above described wherein the valve body comprises a tubular portion forming a fluid conduit, a tubular extension projecting it one direction from said tubular body portion, and a tubular extension projecting in the opposite direction from said tubular body portion and in alinement with the first extension, said extensions accommodating a rotatably supported valve operating crank shaft. By using the oppositely disposed extensions in the particular combination, a valve member of substantially the same diameter as the tubular body portion in which the valve is movable may be used, the tubular extensions providing for the flow of fluid both above and below the valve member when the latter is open with a minimum of obstruction to the flow.

A more specific object of the invention is to provide a construction as above described wherein the diameter of the bore within which the valve disk is slidable is slightly larger than the diameter of the bores of the extensions, whereby the valve disk is supported against transverse movement and is maintained in axial alinement with its seat without any special or complicated supporting means.

Other objects of the invention are to provide a valve which is relatively simple in construction, which has a minimum number of easily cleanable parts, which provides for quick separation or assembly of the parts, and which is otherwise well adapted for the purpose described.

With the above and other objects in view, the invention consists of the improved valve, and all its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a longitudinal sectional view through the valve body illustrating the operating parts therein, the full lines showing the location of moving parts when the valve is open, and the dot and dash line positions showing the location of said parts when the valve is closed;

Fig. 2 is a sectional view taken along the line 2—2 of Fig. 1; and

Fig. 3 is a fragmentary sectional view taken along the line 3—3 of Fig. 1.

Referring more particularly to the drawing, the valve body is designated generally by the numeral 5, and it is formed preferably of stainless steel or other suitable material. It comprises a tubular portion 6, forming a fluid conduit, having a tubular extension 7 projecting at substantially right angles in one direction, and having a tubular extension 8 projecting at substantially right angles in the opposite direction, and in axial alinement with the extension 7.

One side of the tubular portion 6 has a bore portion 9 of one diameter and the other side has a bore portion 10 of slightly larger diameter. Between these two bore portions is a tapered shoulder forming a valve seat 11. The difference in the diameters of the bore portions 10 and 11 is just enough to form a suitable seat.

The diameter of the bore 12 of the tubular extension 7, as well as the diameter of the bore 13 of the tubular extension 8, is slightly less than the diameter of the bore portion 10. With this arrangement the valve disc 14 is maintained in a proper position of axial alinement with its seat, is guided in slidable movement, and is prevented from dropping downwardly when in the open position shown by full lines in Fig. 1. This is because the intersection of the bore portion 10 by the bores 12 and 13, which latter are of less diameter, leaves the concavities shown at 10 in Fig. 3 at the place of intersection.

The valve disc is provided with a rearwardly projecting bar 15 forming a valve stem. This bar is of the same width as the diameter of the bore portion 10 and has its side edges curved as at 16 to conform to the curvature of the bore portion 10. Thus, the bar shaped valve stem serves as a guide and as a support for the valve disc. This eliminates the necessity of using any complicated mechanism which might be objectionable from the sanitary standpoint.

The outer end of the extension 7 has an internal tapered seat 17 and external threading 18. A bearing disc 19 has a central opening 20 of one diameter which communicates with a gasket opening 21 of larger diameter. The disc 19 cooperates with the seat 17 and is removably held in position by a nut 22 threaded on the threads 18.

At the outer end of the opposite extension 8 there is an internal tapered seat 23 and external threading 24. A cap 25 which cooperates with the seat 23 is removably held in position by a nut 26. Above the cap 25 is a bearing disc 27 having a center hole 28.

A crank shaft 29 has its lower end rotatable in the hole 28 of the bearing disc 27. The crank shaft has an intermediate eccentric portion which extends through a slot 30 in the valve stem 15. The upper portion of the crank shaft has an enlarged integral collar 31 just below the bearing disc 19 and has a portion 32 of less diameter extending rotatably through the opening 20 of the bearing disc 19. The portion 32 connects with a bent handle portion 33. A suitable packing ring 34, of synthetic rubber or other suitable material, may be employed in the enlarged bore portion 21 of the bearing disc 19 to surround the portion 32 of the crank shaft. The packing ring bears frictionally against the portion 31 during rotation of the crank shaft.

In use of the valve, when the operating handle is in the full line position of Fig. 1, the valve disc 14 will be in the full line, open position illustrated. Upon turning the handle 32 to the dot and dash line position, the eccentric portion of the crank shaft will act on the edges of the slot 30 of the valve stem 15 to move the valve disc 14 into engagement with the seat 11 as is illustrated by dot and dash lines in Fig. 1.

It is to be noted that the valve disc is of substantially the same diameter as the bore portion 10 so as to be slidable therein. By having it of this full diameter and by having the bores of the extensions 7 and 8 of slightly less diameter than the bore portion 10, the valve disc is always maintained in axial alinement with the valve seat and is maintained against dropping down by the opposite concavities formed by the bore portion 10 as is illustrated in Fig. 3. The bar portion 15, forming the valve stem, is specially constructed with rounded side edges to fit the curvature of the bore portion 10 and maintain the valve disc in proper upright position.

By having the extensions 7 and 8 projecting from opposite sides of the main conduit portion 6, a valve disc of the full diameter of the bore portion 10 may be employed without interfering with the free flow of liquid when the valve is in open position. This is due to the fact that liquid in flowing from the bore portion 9 toward the bore portion 10 can pass both above and below the valve disc when it is in the open position of Fig. 1. The only obstruction to the flow is at the sides as is clear from Fig. 3.

To disassemble the valve for cleaning purposes it is merely necessary to remove the nut 22, lift out the crank shaft, slide the valve member out of the open end of the bore 10, and remove the nut 26. All of the parts are very simple to clean when they are removed from the body portion, and all parts of the body may be easily scrubbed as there are no hidden or inaccessible crevices.

It is apparent that the invention is well suited for use in pasteurizing or similar equipment as the valve provides for the free flow and free drainage of liquid past the valve member when the latter is in open position.

Various changes and modifications may be made without departing from the spirit of the invention, and all of such changes are contemplated as may come within the scope of the claims.

What I claim is:

1. In a valve, a tubular body forming a fluid conduit and having axially alined portions of different bore diameters to provide a valve seat therebetween, a cylindrical valve member of substantially the same diameter as said larger bore movable axially therein into and out of engagement with said seat, a tubular extension projecting at a right angle from the larger bore portion radially with respect to the axis of said bore and adjacent said seat, a tubular extension projecting from the opposite side of said body and in axial alinement with said first extension, and a crank shaft having opposite end portions rotatably supported in said extensions and having an intermediate eccentric portion engageable with said valve member to operate the latter, said tubular extensions having bores of less diameter than the bore within which the valve member moves whereby there are opposite side portions of said larger bore which are engaged by said valve member throughout the length of movement thereof to guide and maintain said valve member in alinement with its valve seat.

2. In a valve, a tubular body forming a fluid conduit having a bore with an inlet and an outlet, said inlet being formed with a valve seat, a cylindrical valve member movable axially in said bore into and out of engagement with said seat and having substantially the same diameter as the bore in which it moves, a tubular extension projecting at a right angle from one side of said body radially with respect to the axis of said bore and adjacent said seat between said seat and said outlet, a tubular extension projecting from the opposite side of said body and in axial alinement with said first extension, and a crank shaft having opposite end portions rotatably supported in said extensions and having an intermediate eccentric portion engageable with said valve member to operate the latter, said tubular extensions having bores of less diameter than the bore within which the valve member moves whereby there are opposite side portions of said larger bore which are engaged by said valve member throughout the length of movement thereof to guide and maintain said valve member in alinement with its valve seat.

3. In a valve, a tubular body forming a fluid conduit having a bore with an inlet and an outlet, said inlet being formed with a valve seat, a valve member movable axially of said bore into and out of engagement with said seat, a tubular extension projecting at an angle from one side of said body adjacent said seat and between said seat and said outlet, a tubular extension projecting from the opposite side of said body and in axial alinement with said first extension, apertured bearing discs supported in said extensions, and a crank shaft having one end journalled in the aperture of the bearing disc of one extension and having its other end extending rotatably through the aperture of the bearing disc of the opposite extension, said crank shaft having an eccentric portion engageable with the valve member to operate the latter.

4. In a valve, a tubular body forming a fluid conduit having a bore with an inlet and an outlet, said inlet being formed with a valve seat, a valve member movable axially of said bore into and out of engagement with said seat, a tubular extension projecting at an angle from one side of said body adjacent said seat and between said seat and said outlet, a tubular extension projecting from the opposite side of said body and in axial alinement with said first extension, apertured bearing discs supported adjacent the ends of said extensions, a crank shaft having one end journalled in the aperture of the bearing disc of one extension and having its other end extending rotatably through the aperture of the bearing disc of the opposite extension, said crank shaft having an eccentric portion engageable with the valve member to operate the latter, and nuts threaded on the ends of said extensions for removably maintaining said bearing discs in position.

5. In a valve, a tubular body forming a fluid conduit having a bore with an inlet and an outlet, said inlet being formed with a valve seat, a valve member movable axially of said bore into and out of engagement with said seat, a tubular extension projecting at an angle from one side of said body adjacent said seat and between said seat and said outlet, a tubular extension projecting from the opposite side of said body and in axial alinement with said first extensions, apertured bearing discs supported in said extension, a crank shaft having one end journalled in the aperture of the bearing disc of one extension and having its other end extending rotatably through the aperture of the bearing disc of the opposite extension, and a packing ring in said last mentioned aperture surrounding said crank shaft, said crank shaft having an eccentric portion engageable with the valve member to operate the latter.

6. In a valve, a tubular body forming a fluid conduit having a bore with an inlet and an outlet, said inlet being formed with a valve seat, a valve disc movable axially in said bore into and out of engagement with said seat and having substantially the same diameter as the bore in which it moves, a bar forming a valve stem projecting rearwardly from said valve disc and having a transverse slot therein, the width of said bar being the same as the diameter of the valve disc and the side edges of the bar being rounded to conform to the curvature of the bore portion in which the valve moves, a tubular extension projecting at a right angle from one side of said body radially with respect to the axis of said bore and adjacent said seat between said seat and said outlet, a tubular extension projecting from the opposite side of said body and in axial alinement with said first extension, and a crank shaft having opposite end portions rotatably supported in said tubular extensions and having an eccentric portion extending through the slot of the valve stem to operate the latter, said tubular extensions having bores of less diameter than the bore within which the valve disc moves whereby said valve disc is always guided and maintained in alinement with its valve seat.

7. In a valve: a tubular body forming a fluid conduit and having axially alined portions of different bore diameters to provide a valve seat therebetween, the portion of smaller bore diameter forming an inlet and the portion of larger bore diameter forming an outlet for said valve body; a valve disc of substantially the same diameter as said larger bore movable axially therein into and out of engagement with said seat; a tubular extension projecting at an angle from the larger bore portion immediately adjacent said valve seat; and a crank shaft rotatably supported in said extension and having an eccentric portion engageable with said valve member to operate the latter, there being side portions of the larger bore at the intersection of said tubular extension with said larger bore which are engaged by said valve disc throughout the length of movement thereof to guide and maintain said valve disc in alinement with said valve seat, and the diameter of said tubular extension being substantially greater than the thickness of said valve disc.

8. In a valve: A tubular body forming a fluid conduit and having axially alined portions of different bore diameters to provide a valve seat therebetween, the portion of smaller bore diameter forming an inlet and the portion of larger bore diameter forming an outlet for said valve body; a valve disc of substantially the same diameter as said larger bore movable axially therein into and out of engagement with said seat; a tubular extension projecting at an angle from the larger bore portion immediately adjacent said valve seat; and a crank shaft rotatably supported in said extension and having an eccentric portion engageable with said valve member to operate the latter, said tubular extension having a bore diameter not larger than that of the bore within which the valve member moves, whereby there are opposite side portions of said larger bore at the intersection of said tubular extension with the larger bore which are engaged by said valve member throughout the length of movement thereof to guide and maintain said valve member in alinement with its seat, and the diameter of said tubular extension being substantially greater than the thickness of said valve disc.

9. In a valve, a tubular body forming a fluid conduit and having axially alined portions of different bore diameters to provide a valve seat therebetween; a valve disc of substantially the same diameter as said larger bore movable axially therein into and out of engagement with said seat; a tubular extension projecting at an angle from the larger bore portion; and a crankshaft rotatably supported in said extension and having an eccentric portion engageable with said valve member to operate the latter, said tubular extension having a bore of less diameter than the bore within which the valve member moves, whereby there are opposite side portions of said larger bore which are engaged by said valve member throughout the length of movement thereof to guide and maintain said valve member in alinement with its valve seat.

10. In a valve: a tubular body portion forming a fluid conduit and having axially alined inlet and outlet portions of different bore diameters to provide a valve seat therebetween; a circular valve member having substantially the same diameter as said larger bore movable axially therein into and out of engagement with said seat; a bar forming a valve stem projecting rearwardly from said valve member, the width of said bar being the same as the diameter of the valve member and the side edges of the bar being rounded to conform to the curvature of the larger bore; a tubular extension projecting at an angle from the larger bore adjacent said valve seat; and a crank shaft rotatably supported in said tubular extension and having an eccentric portion in engagement with said bar to operate the valve, there being opposite side portions of said larger bore which are positioned for engagement by the edges of said bar throughout the length of movement of the bar to guide and maintain said valve member in alinement with said valve seat, and the diameter of said tubular extension being substantially greater than the axial thickness of said circular valve member.

FERDINAND HINRICHS.

REFERENCES CITED

The following references are of record in the file of this patent:

UNITED STATES PATENTS

| Number | Name | Date |
| --- | --- | --- |
| 812,730 | Donnelly | Feb. 13, 1906 |
| 900,984 | Coe | Oct. 13, 1908 |
| 2,032,302 | Novotny | Feb. 25, 1936 |
| 2,055,122 | Farmer | Sept. 22, 1936 |